US011579903B2

(12) United States Patent
Shashoua et al.

(10) Patent No.: US 11,579,903 B2
(45) Date of Patent: Feb. 14, 2023

(54) DESKTOP ENABLING OF WEB DOCUMENTS

(71) Applicant: Zive, Inc., Stamford, CT (US)

(72) Inventors: Eric Shashoua, Stamford, CA (US); Pall Ivarsson, Manhattan Beach, CA (US); Anton Zmieiev, Reshetylivka (UA); Ryan Shetley, Cape Girardeau, MO (US)

(73) Assignee: Zive, Inc., Stamford, CT (US)

( * ) Notice: Subject to any disclaimer, the term of this patent is extended or adjusted under 35 U.S.C. 154(b) by 0 days.

(21) Appl. No.: 17/346,067

(22) Filed: Jun. 11, 2021

(65) Prior Publication Data

US 2021/0406042 A1 Dec. 30, 2021

Related U.S. Application Data

(62) Division of application No. 16/191,995, filed on Nov. 15, 2018, now Pat. No. 11,061,699.

(60) Provisional application No. 62/586,788, filed on Nov. 15, 2017.

(51) Int. Cl.
*G06F 9/451* (2018.01)
*G06F 16/955* (2019.01)
*G06F 40/166* (2020.01)
*G06F 40/134* (2020.01)

(52) U.S. Cl.
CPC ............ *G06F 9/451* (2018.02); *G06F 16/955* (2019.01); *G06F 40/134* (2020.01); *G06F 40/166* (2020.01)

(58) Field of Classification Search
CPC ....... G06F 40/166; G06F 9/451; G06F 16/955
See application file for complete search history.

(56) References Cited

U.S. PATENT DOCUMENTS

| 5,737,560 A * | 4/1998 | Yohanan ............... G06F 16/955 |
| | | 715/733 |
| 9,002,808 B1 * | 4/2015 | Liu ....................... G06F 16/168 |
| | | 707/694 |
| 9,372,681 B1 * | 6/2016 | Shevchenko ........... G06F 9/445 |
| 11,061,699 B2 | 7/2021 | Shashoua et al. |

(Continued)

FOREIGN PATENT DOCUMENTS

WO    WO-0051019 A1 *  8/2000    ......... G06F 17/2247

OTHER PUBLICATIONS

Google. Manifest—File Handlers, https://developer.chrome.com/apps/manifest/file_handlers (2016).

(Continued)

*Primary Examiner* — Asher D Kells
(74) *Attorney, Agent, or Firm* — Wilson Sonsini Goodrich & Rosati

(57) ABSTRACT

Systems and methods for interacting with a web-based document using a desktop-based application, wherein the application includes a web content renderer and is configured to appear as an application native to the operating system using the native graphical user interface for selecting a web-based document for the application to open, retrieving the contents of the document from the URL associated with the document, displaying, using the application, the contents of the retrieved document using the graphical user interface, and enabling, using the application, a user to edit the contents of the retrieved document using the graphical user interface.

13 Claims, 3 Drawing Sheets

(56) References Cited

U.S. PATENT DOCUMENTS

| | | | | |
|---|---|---|---|---|
| 2003/0158953 | A1* | 8/2003 | Lal | H04L 69/40 709/218 |
| 2004/0148307 | A1* | 7/2004 | Rempell | G06F 8/20 707/999.102 |
| 2007/0150477 | A1* | 6/2007 | Barsness | G06F 16/9566 707/E17.115 |
| 2008/0279197 | A1* | 11/2008 | Faisal | H04L 45/306 370/396 |
| 2009/0228779 | A1* | 9/2009 | Williamson | H04L 67/306 715/205 |
| 2011/0035435 | A1* | 2/2011 | Meng | G06F 9/54 709/203 |
| 2011/0078678 | A1* | 3/2011 | Matthews | G06F 9/445 717/174 |
| 2013/0151996 | A1* | 6/2013 | Nario | H04W 12/06 715/760 |
| 2013/0219264 | A1* | 8/2013 | Lemonik | G06F 40/143 715/234 |
| 2014/0019836 | A1* | 1/2014 | Sampathkumaran | G06F 16/955 715/205 |
| 2014/0047517 | A1* | 2/2014 | Ding | H04L 12/1453 726/5 |
| 2014/0136954 | A1* | 5/2014 | Ligman | G06F 17/00 715/234 |
| 2014/0229839 | A1* | 8/2014 | Lynch | G06F 3/0482 715/736 |
| 2014/0310589 | A1* | 10/2014 | Heiney | G06F 16/95 715/234 |
| 2015/0278388 | A1* | 10/2015 | Markov | G06F 16/986 715/744 |
| 2016/0313882 | A1* | 10/2016 | Brown | G06F 16/986 |
| 2018/0219923 | A1* | 8/2018 | Berger | H04L 67/141 |

OTHER PUBLICATIONS

Google. Url_handlers, https://developer.chrome.com/apps/manifest/url_handlers (2016).

Google. What Are Packaged Apps? https://chrome-apps-doc2.appspot.com/trunk/apps/about_apps.html (2013).

U.S. Appl. No. 16/191,995 Office Action dated Oct. 28, 2020.

* cited by examiner

DESKTOP ENABLING OF WEB DOCUMENTS

CROSS REFERENCE TO RELATED APPLICATIONS

The present invention is a divisional application of U.S. non-provisional application Ser. No. 16/191,995, filed Nov. 15, 2018, now U.S. Pat. No. 11,061,699, which claims priority to U.S. provisional application No. 62/586,788, filed Nov. 15, 2017, the entire disclosure of which is hereby incorporated by reference as if set forth in its entirety herein.

TECHNICAL FIELD

Embodiments relate generally to a system and method for interacting with a web-based document using a desktop-based application, and more specifically to methods and systems for making interactions with the web-based document similar to native interactions with a document on the desktop computer.

BACKGROUND

Current services for web-based documents, such as Google Docs, Microsoft Office365 online documents, and iCloud Pages, deliver document access to users through a website. The websites are viewed in a web browser application and served to the user with the same user interface as any other website or web page.

Users may also store documents on their computer. Users may use productivity suites such as Microsoft Office or iWork to interact with these documents. Users may then share these documents with others by emailing individual documents to another user or uploading individual documents to a web-based file hosting service, such as Dropbox.

Existing techniques open web-based documents in a website-based interface, rather than opening documents in a separate desktop-based application. These techniques require users to learn two different paradigms for interacting with documents, and can result in confusion if a user desires to edit a web-based document and inadvertently selects a desktop-based productivity suite for editing (or vice versa).

A need exists, therefore, for systems, methods, and devices that overcome these disadvantages.

SUMMARY

This summary is provided to introduce a selection of concepts in a simplified form that are further described below in the Detailed Description. This summary is not meant or intended to identify or exclude key features or essential features of the claimed subject matter, nor is it intended to be used as an aid in determining the scope of the claimed subject matter.

In one aspect, embodiments relate to a method of interacting with a web-based document using a desktop-based application. The method includes providing a computer, the computer having an operating system; selecting, using a graphical user interface of the computer, a first web-based document for the application to open, the first document being associated with a first URL; retrieving the contents of the first document from the first URL using a network interface of the computer; displaying, using the application, the contents of the first document using the graphical user interface; and enabling, using the application, a user to edit the contents of the first document using the graphical user interface, wherein the application comprises a web content renderer and is configured to appear as an application native to the operating system using the graphical user interface.

In some embodiments, the contents of the first web-based document, selected using the graphical user interface comprising an icon associated with a file containing the first URL, are displayed on the graphical user interface without displaying the first URL.

In some embodiments, selecting the first web-based document comprises selecting, using the graphical user interface, a hyperlink containing the first URL in a webpage.

In some embodiments, the method further includes registering a file type handler associated with a file type with the operating system and wherein the file containing the first URL has a file type matching that of the registered handler, and the file type handler initiates the retrieval of the contents of the first document upon the selection of the file containing the first URL.

In some embodiments, the method further includes registering a URL handler associated with a URL type with a web browser and wherein the hyperlink selected has a URL type matching that of the registered handler, and the URL handler initiates the retrieval of the contents of the first document upon the selection of the hyperlink containing the first URL.

In some embodiments, the method further includes validating the first URL.

In some embodiments, the application does not appear as a web browser.

In another aspect, embodiments relate to a system to facilitate user interaction with a web-based document on a desktop computer. The desktop computer includes a document handler, configured to supply a web-based document to a web content renderer, the web-based document associated with a document URL and modify the web-based document prior to supply by injecting at least one script executable by a web content renderer into the web-based document; and an operating system comprising at least one of a registered URL handler and a registered filetype handler; and a web content renderer.

In some embodiments, the system is further configured to record a list of recently opened web-based documents.

In some embodiments, the injected script allows an end user to select a web-based document for editing from the list of recently opened web-based documents.

In some embodiments, the document handler and the web content renderer together comprise an application, and the application is configured to save a workspace when the application is closed and to restore the workspace when the application is re-opened.

In some embodiments, the application is configured to register a property of the web-based document with the operating system.

In some embodiments, the web content renderer displays its output in a window on the computer controlled by the operating system; and the window lacks at least one of a URL address bar, tab bar, and a link to an external website.

In some embodiments, the script is JavaScript.

In some embodiments, the system further includes a desktop icon, wherein upon selection of the desktop icon, the web-based document is displayed in a window on the computer.

In some embodiments, the system further includes a network interface configured to use an internet connection.

In some embodiments, the operating system further includes a notification system.

In some embodiments, the desktop icon is associated with a file containing the document URL.

In some embodiments, the document handler is further configured to load the web-based document prior to supplying it to the web content renderer.

In some embodiments, the document handler is further configured to intermittently reload the web-based document prior to supplying it to the web content renderer.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
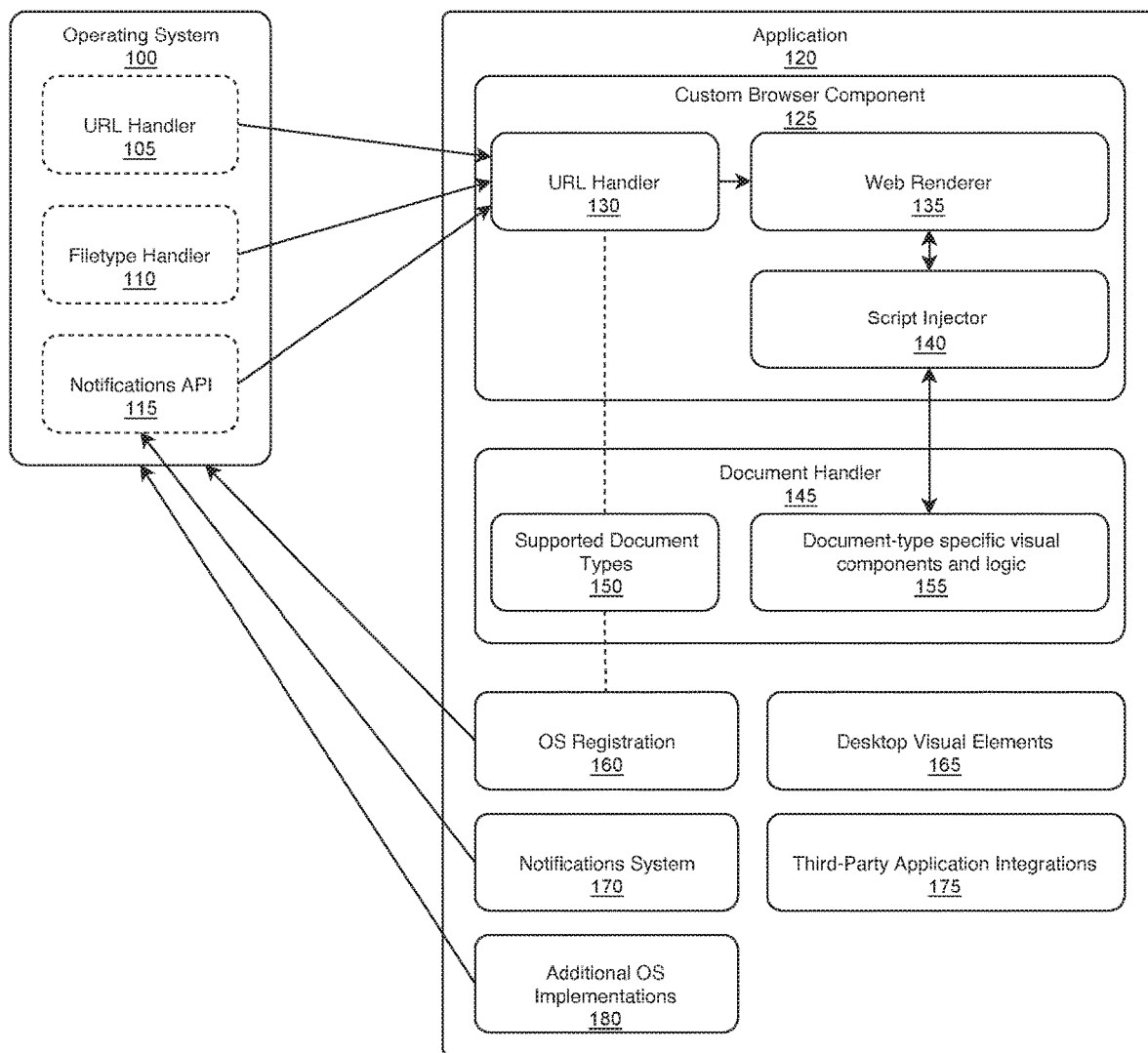
FIG. 1 illustrates a system comprising an application and an operating system for interacting with a web-based document, in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs and in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments provide a method and system of interacting with web-based documents using a desktop-based application. Embodiments enable a user to edit the contents of a web-based document associated with a URL using a graphical user interface and a web content renderer, such that the application enabling the user to edit the document is configured to appear as an application native to the desktop computer and its operating system In some embodiments, the system and method for interacting with web-based documents may use a desktop application rather than interacting with the web-based documents as web-pages in a web browser. The desktop application may include user interface features specifically designed for allowing interaction with those webpage-based documents in a manner of a desktop, document-based application. The system and method may allow interaction with web-based documents across multiple accounts. In some embodiments, the web-based documents may be opened on a desktop in a manner analogous to files local to the desktop computer and its operating system.

In some embodiments, the system may comprise an application and an operating system. FIG. 1 illustrates system comprising an application 120 and an operating system 100 for interacting with a web-based document, in accordance with one embodiment. In some embodiments, the operating system 100 may include a URL handler 105, a filetype handler 110, and a notifications application program interface ("API") 115. In some embodiments, the operating system 100 may only include a URL handler 105 or may only include a filetype handler 110.

A filetype handler 110 is a reference to a program registered with the desktop computer's operating system to handle the processing of particular type(s) of files. When a file of a given type is opened or executed on the computer, the operating system 100 may follow the handler 110 to invoke the application 120 that is capable of handling the file, in some embodiments, the filetype handler 110 may verify a file path associated with a document prior to opening it with the default registered application 120.

Similarly, a URL handler 105 is a reference to a program registered with a web browser to handle the processing of a URL of a specific protocol.

As depicted, in this embodiment both the URL handler 105 and the filetype handler 110 point to the same registered application 120. In particular, it is contemplated that the filetype handler 110 will be registered to handle files containing URLs pointing to web-based documents. Then, when these files are opened on the desktop computer, the filetype handler 110 sends the URL in the file to the URL handler 130 of the application 120, which processes the URL and the associated web-based document as discussed below. If instead a URL is selected in the web browser, the URL handler 105 will route the URL to the application 120 where it will be processed beginning with the URL handler 130 as discussed below.

In some embodiments, to interact with the desktop environment, the operating system 100 may communicate with the application 120. The application 120 may be registered with operating system 100 specific systems, including the filetype handler 110, URL handler 105, and the notifications API 115. In some embodiments, the application 120 may comprise several components enabling the application 120 to handle specific types of document-based web content. The application 120 may be integrated directly into the desktop environment of the computer.

In some embodiments, the operating system 100 is in communication with the application 120 through the URL handler 130. In some embodiments, the application 120 may have a custom browser component 125 comprising a URL handler 130, a web renderer 135, and a script injector 140 in some embodiments, the script injector 140 is configured to inject JavaScript into a web-based document. The custom browser component 125 may interact with websites through standard web technologies such as, e.g., HTTP.

As discussed above, the application 120 may be invoked when a file containing a URL is opened by a filetype handler 110 associated with such files or when a URL relating to document editing is selected in a web browser and opened by a URL handler 105. Either way, the URL handler 130 receives the applicable URL and retrieves the web-based document associated with the URL before providing it to the web renderer 135 for display to the end user. The display process may be iterative, as the script injector 140 adds scripts to the retrieved web document that are subsequently displayed by the web renderer 135. As a user interacts with the rendered document and the scripts therein, the script injector 140 may change, add, or delete scripts from the document.

This iterative injection/render cycle enables the implementation of functionality typically found in desktop applications within the context of web documents being edited by, in this embodiment, a specialized web browser that has been developed to be similar in appearance to a desktop application. For example, iterative script injection and rendering can be used to add a menu listing recently viewed documents in a selectable list, such that selection of a particular item causes the application 120 to load the selected document.

In some embodiments, the web-based document may be retrieved by the application 120 through a URL. URLs can stem from links selected by a user within the application 120, a secondary application (such as a web browser), or through a clipboard copy action. Files may also contain a URL for the application 120 to retrieve, rather than having document data stored in a local disk. When the application 120 is activated in some embodiments by, e.g., double-clicking on an icon on a desktop associated with the URL-containing file, the application 120 may process the URL from the file similarly to a URL selected by a user clicking on it and display the selected document.

The custom browser component 125 may be called when the application 120, secondary application (not shown), or operating system 100 receives an instruction to open a URL or a file containing a URL. In some embodiments, the URL handler 130 is a component of the custom browser component 125 capable of determining whether the application 120 is appropriate for the URL, the file, or the URL contained in the file.

In some embodiments, the custom browser component 125 may also include a web renderer 135. In some embodiments, the URL handler 130 may be in communication with the web renderer 135. A web renderer 135 may be used in web browsers to retrieve, render, and control web content. In some embodiments, the web renderer 135 may retrieve and render content associated with URLs received from the URL handler 130. In some embodiments, the web renderer 135 may comprise a plurality of handlers usable by the application 120 to facilitate bi-directional communication with the application 120 and websites.

In some embodiments, through the script injector 140 each document sent to the web renderer 135 may have a series of scripts injected into the webpage associated with the document. In some embodiments, the scripts may modify the behavior of a document. In some embodiments, a script may modify a visual element 155 of the web-based document. For example, a script may remove a displayed URL from the document when the document is being displayed by the application 120.

In some embodiments, after a script is injected into a loaded document, the script may begin communication with the application 120. In some embodiments, the application 120 may interact with the web-based document and be configured to perform tasks including, but not limited to, recording a list of recent documents opened, saving a workspace that may be restored after closing the application or shutting down the computer, and registering the document with an operating server-level feature 160, such as a timeline feature.

The custom browser component 125 may be configured to consult a document handler 145, external to the custom browser component 125, to determine if the application 120 is capable of processing the document associated with the file name or URL. In some embodiments, the document handler 145 may be a logical component and may access a list of supported document types 150 to determine if the application 120 is capable of opening the document. In some embodiments, the supported document types 150 are identified from the information provided by the URL handler 130, such as the protocol associated with the URL or the filetype extension. In some embodiments, the document hander 14S may access predefined document type settings such as visual window look and size, scripts that may be used for modifying document behavior, and the general pipeline for desktop and document interaction in response to handling a web-document of a particular type.

In some embodiments, the supported document type list 150 may also be used as part of the URL handling process 130 in the browser component 125. In some embodiments, the document handler 145 may provide the majority of the logic behind the script injector 140, determining the timing and content of scripts added to the web-based document. In some embodiments, the document handler 145 may be configured to control desktop-level interaction with documents.

In some embodiments, the custom browser component 125 may be configured to respond to a user-initiated action outside of the document itself. For example, the custom browser component 125 may respond to a user interacting with a desktop-level file menu action to insert content directly from a user's desktop into a document associated with the application 120.

In some embodiments, a user may open a web-based document in a desktop application window that is visually distinct from a web browser window and may be designed to resemble a window from an application native to the operating system of the desktop computer. The window housing the web-based documents on the desktop, in some embodiments, may be designed to lack or otherwise remove various browser-based elements, including the URL address bar, tab bar, and links to external websites. In some embodiments, the graphical user interface may display a web-based document without displaying the URL associated with the web-based document.

In some embodiments, the application 120 may control visual elements on the desktop of a computer 165. For example, in some embodiments, the graphical user interface may associate a particular type of file with an icon associated with the application 120, and the application 120 itself may have its own icon. These icons may appear on a toolbar on the desktop of a computer, separate from the icon associated with the computer's web browsing program(s).

In some embodiments, the application 120 may open a web-based document in a window dedicated to showing only that document rather than, e.g., a tab-based window for opening multiple documents and/or websites. In some embodiments, the dedicated window may have a window title stored and recognized by the operating system 100 relating specifically to that document and not the website serving that document or a generic descriptor for a collection of unrelated windows. In some embodiments, the document window may be treated by the operating system 100 as a separate, unique window rather than a collection of windows.

In some embodiments, the application 120 may detect a previously unopened document. If a user instructs the application 120 to open the document, in some embodiments, the application may detect the size and/or type of the document and may automatically display a window that is adjusted to the size and shape of that particular document type. For example, in some embodiments, a Google Doc may open in a window that is as wide as the document inside that window, without space to either side, and in a format that is tall and narrow rather than generically wide like it would in the browser. In some embodiments, a spreadsheet such as a Google Sheet may open in a window that is wide and short. In some embodiments, a presentation document such as a Google Slides document may open in a window that is closer in dimensions to a square.

In some embodiments, if the document has been opened previously in the application 120, the application 120 may re-open the document in the same size, shape, and with the same position as when it was last opened in the application 120, as such information may be stored in the application 120. In some embodiments, the opening display size of the document may not be constrained to being opened in a window the same size and shape as the web browser window used to select the document.

In some embodiments, the window may display visual elements, such as the color indicator of the title bar associated with the web-based document, a colored title bar, or a colored line underneath a title bar, or any such combination, to indicate which of multiple web-based accounts or services the associated document is served from.

In some embodiments, a user may use the graphical user interface to select an icon representing a web-based document for the application 120 to open. In some embodiments, a user may select the first web-based document by selecting a hyperlink somewhere on the graphical user interface.

In some embodiments, the application 120 may include a network-change handler to determine the state of the internet connection and if the application 120 should treat a disconnection or connection to the internet differently.

In some embodiments, a sleep handler may be used to handle events when the computer has entered and exited a sleep state, giving the application 120 an option to retrieve new content and perform maintenance tasks during a sleep state or in a transition to a sleep state.

In some embodiments, the application 120 and its windows may contain desktop-based visual elements 165 such as a menu bar familiar to desktop users, including file, edit, and view tabs. These tabs may have functionality that directly ties into the application 120 or active document displayed by the application 120 implemented either in the application 120 itself or in the document through script injection.

In some embodiments, the application 120 may integrate with the operating system provided notifications system 170, including the notification API 115 of the operating system. This integration may enable the application to trigger desktop notifications relating to events occurring within the application 120. In some embodiments, for example, the application 120 may determine a new or revised document is available for review and may relay a notification to the notifications system 170. In some embodiments, the notifications system 170 may then generate a notification on the desktop, such that the user may be alerted to the event. In some embodiments, the notification may be a visual notification. In some embodiments, the notification may be an audible notification.

In some embodiments, third parties can integrate additional functionality into the application 120 using discrete applications, browser plugins, or injected scripts. These integrations 175 may include components such as third-party analytics, single sign-on integrations, and user-encryption.

Figure 2:
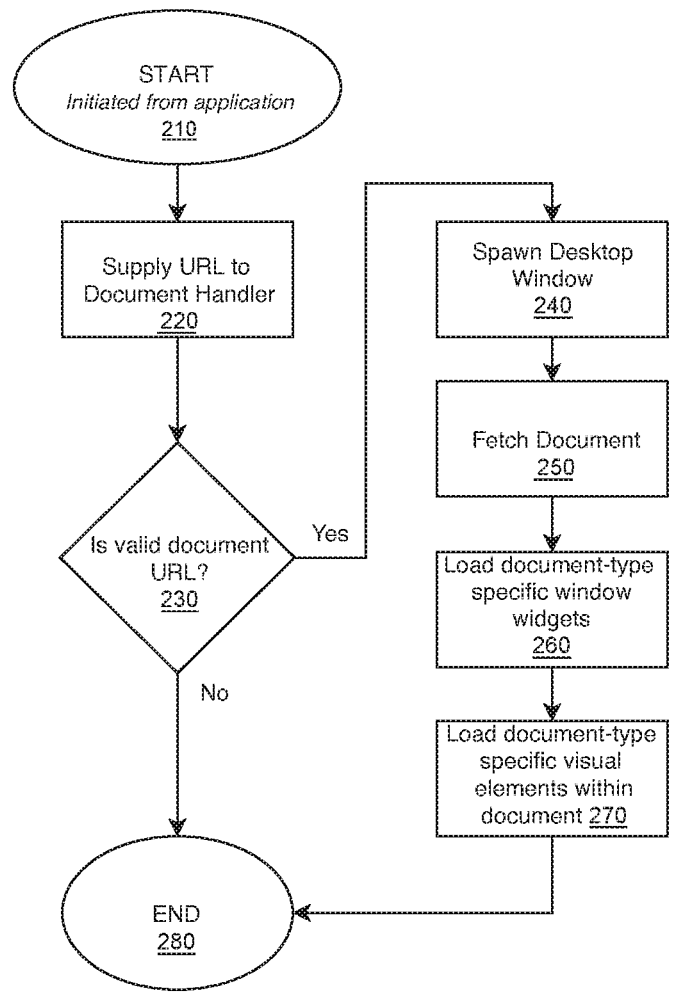
FIG. 2 is a flowchart of a method to load a document associated with a URL, in accordance with one embodiment.

FIG. 2 schematically shows a flowchart for an application instructed to directly load a URL through a user action. A user action may include clicking on a link within the application. The URL may also be loaded via an external process. In some embodiments, the application may be initiated by opening a file on the computer file system 210 containing the URL for a specific document that may then be supplied to a document handler 220. The document handler may then determine whether the document URL is valid 230. In some embodiments, if the URL is not a valid document URL, the application may not attempt to retrieve the document 280. In some embodiments the application may issue a notification that the URL is invalid.

In some embodiments, if the URL is a valid document URL, a desktop window 240 may be displayed to the user. Subsequently, the application may retrieve the document associated with the provided URL 250 and display it in the window. In some embodiments, document-type specific window widgets may be loaded 260 and displayed in the window. In some embodiments, document-type specific visual elements within the document may be loaded 270 and displayed in the window. This may include colors or tabs specific to the document or webpage associated with the document. After all elements related to the document are loaded and displayed, the process may end 280.

Figure 3:
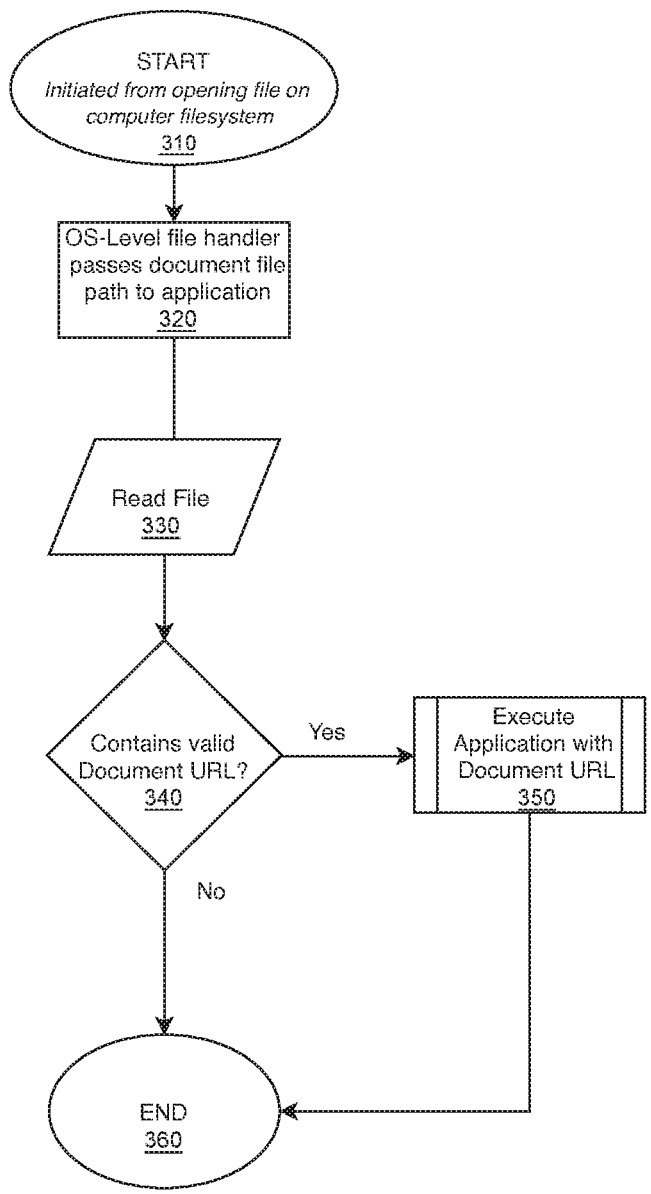
FIG. 3 is a flowchart illustrating a method and system comprising an application registered as a file-type handler, in accordance with one embodiment.

FIG. 3 schematically shows a flowchart for executing an application associated with a document URL, shown in FIG. 2. In some embodiments, the application may register as a file-type handler for specific file-types that may contain URLs associated with web-based documents. In some embodiments, once an example of a specified file type is selected, the application will initiate processing and display of the document 310.

In some embodiments, a file may be opened on a computer file system and the operating-system file handler may provide the document's file path to the application 320. The application may then read the file 330 and determine if the file contains a valid document URL 340. If the document does not contain a valid URL, the application may not attempt to retrieve the document 360. In some embodiments the application may issue a notification that the URL is invalid.

In some embodiments, if the URL is a valid document URL, the application may retrieve and display the document associated with URL 350 as discussed in FIG. 2.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A system to facilitate user interaction with a web-based document using a desktop-based application, the system comprising:
   a memory for storing a set of software instructions, and one or more processors configured to execute the set of software instructions to provide:

(i) the desktop-based application comprising:
a document handler configured to:
supply a web-based document to a web content renderer, the web-based document associated with a document URL; and
modify the web-based document prior to supply by injecting a script executable by the web content renderer into the web-based document;
the web content renderer configured to render the web-based document in a user interface of the desktop-based application that appears as an application native to the operating system outside of a browser by at least executing the injected script; and
(ii) the operating system comprising at least one of a registered URL handler and a registered filetype handler configured to route the document URL to the desktop-based application.

2. The system of claim 1 wherein the computer is further configured to record a list of recently opened web-based documents.

3. The system of claim 2 wherein the injected script is executed to implement a functionality within the user interface and wherein the functionality allows an end user to select a web-based document for editing from the list of recently opened web-based documents.

4. The system of claim 1 wherein the desktop-based application is configured to save a workspace when the desktop-based application is closed and to restore the workspace when the desktop-based application is re-opened.

5. The system of claim 4 wherein the desktop-based application is configured to register a property of the web-based document with the operating system.

6. The system of claim 1 wherein:
the user interface lacks at least one of a URL address bar, tab bar, and a link to an external web site.

7. The system of claim 1 wherein the script is JavaScript.

8. The system of claim 1 wherein the desktop-based application displays a desktop icon within a desktop of the computer, wherein upon selection of the desktop icon, the web-based document is displayed within the user interface on the computer.

9. The system of claim 1 further comprising a network interface configured to use an internet connection and wherein a content of the web-based document is retrieved from the document URL using the network interface.

10. The system of claim 1 wherein the operating system further comprises a notification system.

11. The system of claim 8 wherein the desktop icon is corresponding to the web-based document containing the document URL.

12. The system of claim 1 wherein the document handler is further configured to load the web-based document prior to supplying it to the web content renderer.

13. The system of claim 12 wherein the document handler is further configured to change or delete the script from the web-based document in response to a user interaction with the web-document within the user interface.

* * * * *